United States Patent
Xuan (10) Patent No.: US 10,171,449 B2
(45) Date of Patent: Jan. 1, 2019

(54) ACCOUNT LOGIN METHOD AND DEVICE (71) Applicant: TENCENT TECHNOLOGY (SHENZHEN) COMPANY LIMITED, Shenzhen (CN)

(72) Inventor: Liyong Xuan, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 233 days.

(21) Appl. No.: 15/175,077

(22) Filed: Jun. 7, 2016

(65) Prior Publication Data
US 2016/0294812 A1 Oct. 6, 2016

Related U.S. Application Data (63) Continuation of application No. PCT/CN2015/072983, filed on Feb. 13, 2015.

(30) Foreign Application Priority Data

Dec. 18, 2013 (CN) .......................... 2013 1 0698239

(51) Int. Cl.
*H04L 29/06* (2006.01)
(52) U.S. Cl.
CPC ........ *H04L 63/0815* (2013.01); *H04L 63/083* (2013.01); *H04L 63/10* (2013.01)
(58) Field of Classification Search
CPC .................................................. H04L 63/0815
See application file for complete search history.

(56) References Cited

U.S. PATENT DOCUMENTS 8,898,743 B1 * 11/2014 Kowalik ............. G06F 3/04842
726/4
8,905,303 B1 * 12/2014 Ben Ayed ............ G06Q 20/223
235/375
(Continued)

FOREIGN PATENT DOCUMENTS

CN 102065082 A 5/2011
CN 102291456 12/2011
(Continued)

OTHER PUBLICATIONS

Ming et al., "Authority Separation of User Account in Social Login Privacy Protection Platform", Netinfo Security, Aug. 31, 2013, pp. 21-24.

(Continued)

*Primary Examiner* — Shawnchoy Rahman
(74) *Attorney, Agent, or Firm* — Marshall, Gerstein & Borun LLP (57) ABSTRACT

Provided are an account login method and an apparatus. A first account is associated with a second account, and information of a login target corresponding to the second account is configured. A login request for using the first account to log in to the login target corresponding to the second account is received. Login configuration information of the second account is retrieved based on an association relation between the first account and the second account. Login configuration information of the second account is sent to the login target corresponding to the second account; and the login target corresponding to the second account is logged in to according to the login configuration information of the second account.

12 Claims, 5 Drawing Sheets

(56) References Cited

U.S. PATENT DOCUMENTS

| | | | |
|---|---|---|---|
| 9,032,495 B2* | 5/2015 | Zhang | H04L 63/083 |
| | | | 726/7 |
| 9,838,383 B1* | 12/2017 | Perlmuter | H04L 63/083 |
| 2008/0313721 A1* | 12/2008 | Corella | G06F 21/31 |
| | | | 726/6 |
| 2009/0222899 A1 | 9/2009 | Walters | |
| 2012/0072979 A1* | 3/2012 | Cha | G06F 21/34 |
| | | | 726/7 |
| 2014/0130144 A1 | 5/2014 | Yang et al. | |
| 2017/0041259 A1* | 2/2017 | Tao | H04W 4/12 |

FOREIGN PATENT DOCUMENTS

| | | |
|---|---|---|
| CN | 102882903 A | 1/2013 |
| CN | 103220303 A | 7/2013 |

OTHER PUBLICATIONS

Search Report in International Application No. PCT/CN2015/072983 dated May 8, 2015, 4 pages.

International Preliminary Report on Patentability and Written Opinion in International Application No. PCT/CN2015/072983 dated Jun. 21, 2016, 14 pages.

Office Action in CN Application No. 201310698239.6 dated Mar. 15, 2018, 8 pages.

* cited by examiner

ACCOUNT LOGIN METHOD AND DEVICE

CROSS REFERENCE TO RELATED APPLICATIONS

This application is a continuation application of PCT Patent Application No. PCT/CN2015/072983, filed on Feb. 13, 2015, which claims priority to Chinese Patent Application No. 201310698239.6, filed on Dec. 18, 2013, both of which are incorporated by reference in their entirety.

TECHNICAL FIELD

The present disclosure relates to information processing technologies and to a method and apparatus for login to an account.

BACKGROUND

In the current information era, various information devices are emerging. With merging of consumer electronics, computer, and communication technologies, people pay more and more attention to the study of synthetically utilizing information devices from different fields, so as to fully make use of existing resource devices and better serve people.

Generally, a user may register multiple user accounts in multiple websites respectively. When the user browses different websites, he may use corresponding registered accounts to log in to the websites respectively. At present, many websites have a function of supporting a user to log in to a third party website. For example, a user may use an account of a website A to log in to other websites. This kind of login method eliminates troubles that the user needs to register different accounts in different websites.

SUMMARY

An account login method is provided according to embodiments of the present disclosure, to protect user privacy.

An account login apparatus is provided according to embodiments of the present disclosure to protect user privacy.

The account login method includes:

associating a first account with a second account, and configuring information of a login target corresponding to the second account;

receiving a login request for using the first account to log in to the login target corresponding to the second account, retrieving login configuration information of the second account based on an association relation between the first account and the second account, and sending the login configuration information of the second account to the login target corresponding to the second account; and logging in to the login target corresponding to the second account according to the login configuration information of the second account.

The account login apparatus includes a processor and a memory, in which the memory stores machine executable instructions that can be executed by the processor and the machine executable instructions include a configuration instruction, a login configuration information sending instruction, and a login instruction, in which the configuration instruction is to associate a first account with a second account, and configure information of a login target corresponding to the second account;

the login configuration information sending instruction is to receive a login request for using the first account to log in to the login target corresponding to the second account, search for login configuration information of the second account based on an association relation between the first account and the second account, and send the login configuration information of the second account to the login target corresponding to the second account; and the login instruction is to log in to the login target corresponding to the second account according to the login configuration information of the second account.

A non-transitory computer storage medium stores machine executable instructions to:

associate a first account with a second account, and configure information of a login target corresponding to the second account;

receive a login request for using the first account to log in to the login target corresponding to the second account, search for login configuration information of the second account based on an association relation between the first account and the second account, and send the login configuration information of the second account to the login target corresponding to the second account; and log in to the login target corresponding to the second account according to the login configuration information of the second account.

As can be seen from the foregoing, in the embodiments of the present disclosure, a first account is associated with a second account, and information of a login target corresponding to the second account is configured; a login request for using the first account to log in to the login target corresponding to the second account is received, login configuration information of the second account is retrieved based on an association relation between the first account and the second account, and the login configuration information of the second account is sent to the login target corresponding to the second account; and the login target corresponding to the second account is logged in to according to the login configuration information of the second account. In this way, when the embodiments of the present disclosure are used, a user needs only to use the first account to log in, and when the user logs in to a specific target, he can be automatically switched to the second account to log in. Thus, user privacy can be protected, and meantime flexibility of fast login will not be lost In addition, based on the embodiments of the present disclosure, the user can log in to the specific website using the first account directly, which saves the operations of input of the second account and password verification. The embodiments of the present disclosure are easy to be extended and can be used in a large scale.

BRIEF DESCRIPTION OF THE DRAWINGS

To make the technical method of the embodiments of the present disclosure readily understood, a brief introduction of the accompanying drawings that are needed to describe the embodiments will be provided in the following.

DETAILED DESCRIPTION

To make the technical method and benefits of the present disclosure more readily understood, the embodiments of the present disclosure will be further described hereinafter in conjunction with the accompanying drawings.

When a user uses some traditional account login methods to log in to a (or a kind of) website, he may not want to expose information of his frequently used account (i.e., a main account) to the (or the kind of) website. In this case, the user may desire to use an account which he does not use frequently (i.e., a sub-account) to log in to the (the kind of) website. However, if the user needs to manually input various sub-accounts and passwords to log in, it may not be that flexible for the user to fast log in, and authenticating the sub-accounts may cause costs. Therefore, an account login method and an account login apparatus are provided according to various embodiments of the present disclosure.

Figure 1:
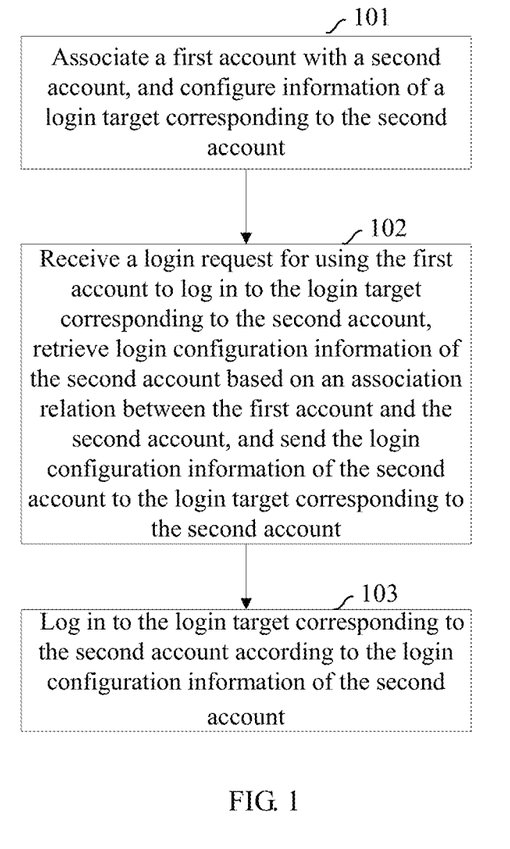
FIG. 1 is a flowchart of an account login method according to various embodiments of the present disclosure.

FIG. 1 is a flowchart of an account login method according to various embodiments of the present disclosure.

As shown in FIG. 1, the method includes the following blocks.

Block 101: A first account is associated with a second account, and information of a login target corresponding to the second account is configured.

Generally, a user registers multiple user accounts in multiple websites. A frequently used account of the user may be referred to as the first account, and an account of the user not frequently used is referred to as the second account.

Some login targets (e.g., internet websites) support a function of fast login of users to a third party login target (e.g., a third party internet website), and these login targets generally use a unified account server to unifiedly authenticate login of user accounts.

The first account and the second account may be associated on an account server, and the account server configures information of the login target corresponding to the second account. In this way, when the user logs in to a common login target, he needs only to use his frequently used account (the first account) to log in, and when the user logs in to some special targets (e.g., a website corresponding to the second account), he may be automatically switched to the second account previously configured to log in.

Block 102: a login request for using the first account to log in to the login target corresponding to the second account is received, and login configuration information of the second account is retrieved based on an association relation between the first account and the second account, and login configuration information of the second account is sent to the login target corresponding to the second account.

When the user uses the first account to launch the login request targeted for the login target, an account server receives and processes the login request. Detailed processing procedures are as follows.

The account server first analyzes the login target of the login request, and if the account server finds that the login target is a common login target (i.e., not a login target corresponding to the second account), then the account server performs authentication using the first account, and after authentication is passed, the account server returns an authentication success message to the login target and returns login configuration information of the first account (e.g., an account name or account number of the first account and points information of the first account) to the login target, so that the user can log in to the login target using the first account.

If the account server finds that the login target is a specific login target (i.e., the login target corresponding to the second account), then the account server retrieves login configuration information of the second account (e.g., an account name or account number of the second account and points information of the second account) based on an association relation between the first account and the second account, and sends login configuration information of the second account to the login target corresponding to the second account. The account server may authenticate the user based on the password of the first account.

In an embodiment, the login request sent by the user is a common login request that includes an account identity of the first account, an account password of the first account and information of the login target corresponding to the second account, and the method first includes:

authenticating the first account based on the account identity of the first account and the account password of the first account, and after passing authentication, retrieving login configuration information of the second account based on the association relation between the first account and the second account, returning an authentication success message to the login target, and sending login configuration information of the second account to the login target corresponding to the second account.

In an embodiment, the login request sent by the user is a fast login request that includes the account identity of the first account and the login target corresponding to the second account, and the method further includes:

authenticating the first account based on the account identity of the first account, and after passing authentication, retrieving login configuration information of the second account based on the association relation between the first account and the second account, returning an authentication success message to the login target, and sending login configuration information of the second account to the login target corresponding to the second account.

Block 103: the login target corresponding to the second account is logged in to according to login configuration information of the second account.

Multiple types of login targets may be logged in to based on the method of the present disclosure, e.g., logging in to an internet website or an application (APP).

In an embodiment, information of the login target corresponding to the second account includes a domain name of a login website; and in this case, a domain name server of the login website is logged in to according to login configuration information of the second account.

In an embodiment, information of the login target corresponding to the second account includes an application identity; and in this case, an application corresponding to the application identity is logged in to according to login configuration information of the second account.

Login configuration information of the second account includes account information of the second account, e.g., an account name or account number of the second account and points information of the second account.

In an embodiment, logging in to the login target corresponding to the second account according to login configuration information of the second account includes: the login target corresponding to the second account sending a login success message to a login requester, in which the login success message includes the account name or account number of the second account; and the account name or account number of the second account is displayed on the login requester.

Based on the foregoing detailed description, an account login apparatus is provided according to embodiments of the present disclosure.

Figure 2:
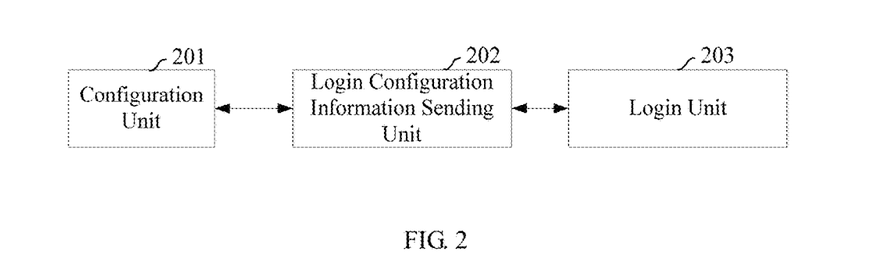
FIG. 2 is a diagram of an account login apparatus according to various embodiments of the present disclosure.

FIG. 2 is a diagram of a structure of an account login apparatus according to various embodiments of the present disclosure.

As shown in FIG. 2, the apparatus includes a configuration unit 201, a login configuration information sending unit 202, and a login unit 203.

The configuration unit 201 associates a first account with a second account, and configures information of a login target corresponding to the second account.

The login configuration information sending unit 202 receives a login request for using the first account to log in to the login target corresponding to the second account, retrieves login configuration information of the second account based on an association relation between the first account and the second account, and sends login configuration information of the second account to the login target corresponding to the second account.

The login unit 203 logs in to the login target corresponding to the second account based on login configuration information of the second account.

In an embodiment, the login request is a common login request that includes an account identity of the first account, an account password of the first account, and the login target corresponding to the second account; and the apparatus further includes an authentication unit (not shown).

The authentication unit authenticates the first account based on the account identity of the first account and the account password of the first account.

In an embodiment, the login request is a fast login request that includes the account identity of the first account and the login target corresponding to the second account; and the apparatus further includes an authentication unit (not shown).

The authentication unit authenticates the first account based on the account identity of the first account.

In an embodiment, information of the login target corresponding to the second account includes a domain name of a login website.

The login unit 203 logs in to a domain name server of the login website according to login configuration information of the second account.

In an embodiment, information of the login target corresponding to the second account includes an application identity.

The login unit 203 logs in to an application corresponding to the application identity according to login configuration information of the second account.

In an embodiment, login configuration information of the second account includes an account name or account number of the second account.

The login unit 203 enables the login target corresponding to the second account to send a login success message to a login requester, and the login success message includes the account name or account number of the second account, and the account name or account number of the second account is displayed on the login requester.

Based on the foregoing description, an account login system is provided according to embodiments of the present disclosure.

Figure 3:
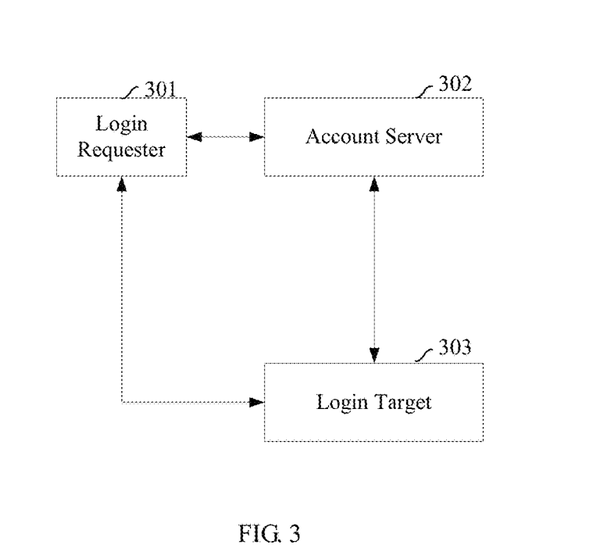
FIG. 3 is a diagram of an account login system according to various embodiments of the present disclosure.

FIG. 3 is a diagram of a structure of an account login system according to various embodiments of the present disclosure.

As shown in FIG. 3, the system includes a login requester 301, an account server 302, and a login target 303.

The login requester 301 sends a login request for using the first account to log in to a login target corresponding to the second account to the account server 302.

The account server 302 associates and stores a second account of the login requester with a first account of the login requester, and configures information of the login target corresponding to the second account; and when receives the login request, the account server 302 retrieves login configuration information of the second account based on an association relation between the first account and the second account, and sends login configuration information of the second account to the login target 303 corresponding to the second account.

The login target 303 allows login of the login requester based on login configuration information of the second account.

The present disclosure will be illustrated in the following in combination with detailed embodiments.

Figure 4:
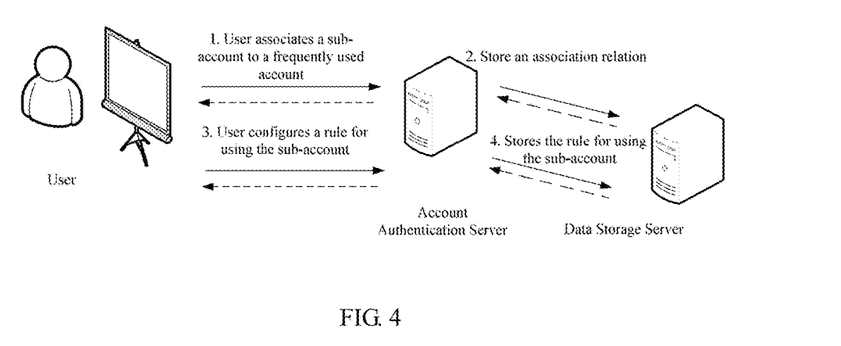
FIG. 4 is a diagram of associating accounts according to various embodiments of the present disclosure.

FIG. 4 is a diagram of associating accounts according to various embodiments of the present disclosure.

In FIG. 4, the account server in FIG. 3 is separated into two independent parts: an account authentication server and a data storage server.

As shown in FIG. 4, assume that the user has a frequently used account number: 123456, and to log in to a website: yinsi.com (a privacy website), the user applies for a sub-account number: 21734325.

First, the user sends an association request to the account authentication server, to apply for associating the sub-account number: 21734325 with his frequently used account number: 123456.

After the account authentication server receives the association request, it stores an association relation between the frequently used account number: 123456 and the sub-account number: 21734325 on the data storage server. Then the user configures a rule for using the sub-account number: 21734325 on the account authentication server, i.e., configuring that a login target corresponding to the sub-account number: 21734325 is the website: yinsi.com. That is, the configured rule is that when the user visits the website yinsi.com, he uses the specified sub-account number: 21734325 to log in.

After the authentication server receives the configured rule, it also stores the configured rule on the data storage server.

After the accounts are associated and the rule is configured, the user can use his frequently used account number: 123456 to log in to various types of websites.

When the user logs in to a common website, the user uses the frequently used account number: 123456 to log in. If the user wants to log in to a certain website (i.e., a website to be logged in to using the sub-account), then the user still can use the frequently used account number: 123456 to log in, but after login to the website, user information will be automatically replaced with information of the sub-account previously configured.

Figure 5:
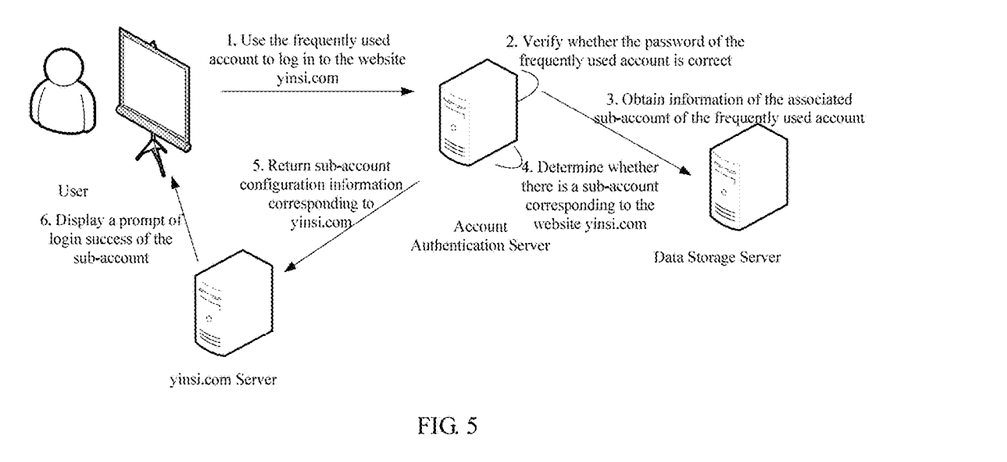
FIG. 5 is a diagram of login to an account according to various embodiments of the present disclosure.

FIG. 5 is a diagram of account login according to various embodiments of the present disclosure.

First, the user uses his frequently used account number 123456 to log in. If the user is intended to log in to a certain website (e.g., yinsi.com), the user does not need to switch to his sub-account manually to log in to the website yinsi.com, but uses his frequently used account number 123456 to log in to the website yinsi.com. The reasons that the user does not want to switch to his sub-account may include:

1. He may need to look for the password of this sub-account, or he may forget the account name and password of the sub-account needed for login to the website yinsi.com.

2. Some instant messaging tools have a fast login mode, and if the instant messaging tool of the main account is in the login mode, the user can fast log in to a third party website without inputting the password again.

When the login authentication server authenticates that the password of the frequently used account number 123456 is correct, the login authentication server obtains information of associated sub-account of the account number 123456 from the data storage server, and determines whether there is an associated sub-account corresponding to the website yinsi.com based on obtained information of the associated sub-account. If there is, then the login authentication server returns the associated sub-account corresponding to the website yinsi.com (i.e., related configuration information of the account number: 21734325) to the website yinsi.com as login user information, and if there is not, then the login authentication server returns information of the frequently used account number 123456 as login user information.

After the server of the website yinsi.com receives related user information of the account number: 21734325 returned from the account authentication server, it sends a login success prompt message to the user.

Practically, the login method and apparatus may be implemented in various ways.

For example, the account login method may be programmed as a plug-in program installed on a personal computer or a mobile terminal in comply with a certain application interface rule, or it may be encapsulated as an application for a user to download and use. When the account login method is programmed as a plug-in program, it may be implemented as ocx, dll, cab, etc. plug-ins. Or the account login method of the embodiments of the present disclosure may be implemented as a Flash plug-in, a RealPlayer plug-in, a multimedia messaging service (MMS) plug-in, a MIDI musical notation plug-in, an Active X plug-in, etc. using specific technologies.

The account login method provided according to the embodiments of the present disclosure may be stored as instructions or an instruction set on various kinds of storage media. The storage media include but are not limited to: a floppy disk, an optical disk, a DVD, a hard disk, a flash, a universal serial bus disk, a compact flash (CF) card, a secure digital (SD) card, a multimedia (MMC) card, a SM card, a memory stick, an xD card, etc.

In addition, the account login method provided according to embodiments of the present disclosure may be applied to a Nand flash-based storage medium, e.g., a universal serial bus disk, a CF card, a SD card, a secure digital high capacity (SDHC) card, a MMC card, a SM card, a memory stick, an xD card, etc.

Figure 6:
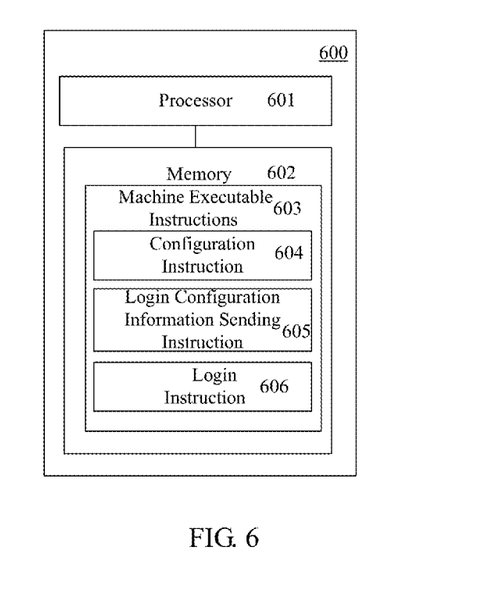
FIG. 6 is a diagram of an account login apparatus according to various embodiments of the present disclosure.
Figure 7:
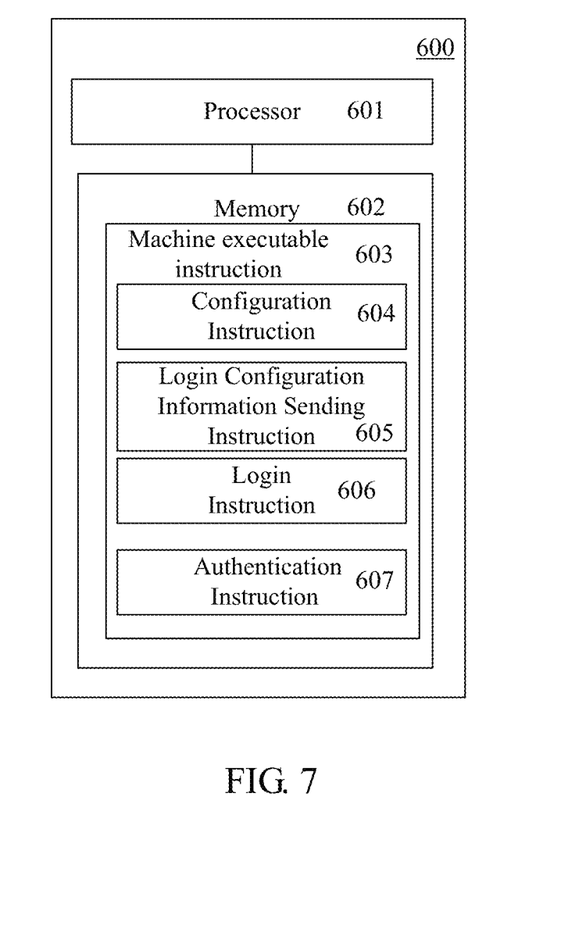
FIG. 7 is a diagram of an account login apparatus according to various embodiments of the present disclosure.

FIG. 6 is a diagram of an account login apparatus according to various embodiments of the present disclosure. FIG. 7 is a diagram of an account login apparatus according to various embodiments of the present disclosure. FIGS. 6 and 7 will be described in the following.

As shown in FIG. 6, the account login apparatus 600 for example includes a processor 601 and a memory 602. The memory 602 stores a machine executable instruction module 603, and the machine executable instruction module 603 can be executed by the processor 601. The memory 602 for example is a non-transitory computer storage medium.

The machine executable instruction module 603 may include a configuration instruction 604, a login configuration information sending instruction 605, and a login instruction 606.

The configuration instruction 604 associates a first account with a second account, and configures information of a login target corresponding to the second account.

The login configuration information sending instruction 605 receives a login request for using the first account to log in to the login target corresponding to the second account, retrieves login configuration information of the second account based on an association relation between the first account and the second account, and sends login configuration information of the second account to the login target corresponding to the second account.

The login instruction 606 logs in to the login target corresponding to the second account according to login configuration information of the second account.

In an embodiment, the login request for example is a common login request that includes an account identity of the first account, an account password of the first account, and the login target corresponding to the second account. The machine executable instruction module 603 further includes an authentication instruction 607 (see FIG. 7). The authentication instruction 607 for example authenticates the first account based on the account identity of the first account and the account password of the first account.

In an embodiment, the login request for example is a fast login request that includes the account identity of the first account and the login target corresponding to the second account. The authentication instruction 607 authenticates the first account based on the account identity of the first account.

In an embodiment, information of the login target corresponding to the second account for example includes a domain name of a login website. The login instruction 606 logs in to a domain name sever of the login website based on login configuration information of the second account.

In an embodiment, information of the login target corresponding to the second account for example includes an application identity. The login instruction 606 may log in to an application corresponding to the application identity based on login configuration information of the second account.

In an embodiment, login configuration information of the second account for example includes an account name or account number of the second account. The login instruction 606 enables the login target corresponding to the second account to send a login success message to a login requester, and the login success message includes the account name or account number of the second account, and the account name or account number of the second account is displayed on the login requester.

As described in the foregoing, in the embodiments of the present disclosure, a second account is associated with a first account, and information of a login target corresponding to the second account is configured; a login request for using the first account to log in to a login target corresponding to the second account is received, login configuration information of the second account is retrieved based on an association relation between the first account and the second account, and login configuration information of the second account is sent to the login target corresponding to the second account; and the login target corresponding to the second account is logged in to according to login configuration information of the second account. As is seen, after the embodiments of the present disclosure are used, a user needs only to use a first account to log in, and when the user logs in to a specific target, he can be automatically switched to a second account to log in. Thus, user privacy can be better protected, and meantime flexibility of fast login will not be lost.

In addition, when the embodiments of the present disclosure are used, a user can use a first account to log in to a specific website directly, without inputting the second account and authenticating the password. Furthermore, the embodiments of the present disclosure are easy to extend and can be used in a large scale.

What is described in the foregoing are only embodiments of the present disclosure, and should not be construed as limitations to the present disclosure. Any changes, equivalent replacements, modifications made without departing from the scope and spirit of the present disclosure are intended to be included within the protecting scope of the present disclosure.

The invention claimed is:

1. An account login method, comprising:
   storing, by a server, an association relation between a first account and a second account, and storing information of a login target corresponding to the second account;
   receiving, by the server, a login request for using the first account to log in to the login target corresponding to the second account, retrieving login configuration information of the second account based on the association relation between the first account and the second account, and sending the login configuration information of the second account to the login target corresponding to the second account; and
   logging in to the login target corresponding to the second account according to the login configuration information of the second account;
   wherein the login request is a common login request that comprises an account identity of the first account, an account password of the first account, and the information of the login target corresponding to the second account; and the method further comprises:
   authenticating the first account based on the account identity of the first account and the account password of the first account.

2. The account login method of claim 1, wherein the information of the login target corresponding to the second account comprises a domain name of a login website; and
   logging in to the login target corresponding to the second account based on the login configuration information of the second account comprises: logging in to a domain name server of the login website based on the login configuration information of the second account.

3. The account login method of claim 1, wherein the information of the login target corresponding to the second account comprises an application identity; and
   logging in to the login target corresponding to the second account based on login configuration information of the second account comprises:
   logging in to an application corresponding to the application identity based on the login configuration information of the second account.

4. The account login method of claim 1, wherein the login configuration information of the second account comprises an account name of the second account; and
   logging in to the login target corresponding to the second account based on the login configuration information of the second account comprises:

sending a login success message to a login requester by the login target corresponding to the second account, wherein the login success message comprises the account name of the second account; and
displaying the account name of the second account on the login requester.

5. An account login apparatus, comprising a processor and a memory, wherein the memory stores machine executable instructions that can be executed by the processor, and the machine executable instructions comprise a configuration instruction, a login configuration information sending instruction, and an login instruction, wherein
   the configuration instruction is to store an association relation between a first account and a second account, and store information of a login target corresponding to the second account;
   the login configuration information sending instruction is to receive a login request for using the first account to log in to the login target corresponding to the second account from a login requester, search for login configuration information of the second account based on the association relation between the first account and the second account, and send the login configuration information of the second account to the login target corresponding to the second account; and
   the login instruction is to log in to the login target corresponding to the second account according to the login configuration information of the second account;
   wherein the login request is a common login request that comprises an account identity of the first account, an account password of the first account and the information of the login target corresponding to the second account; and the machine executable instructions further comprise an authentication instruction;
   wherein the authentication instruction is to authenticate the first account based on the account identity of the first account and the account password of the first account.

6. The account login apparatus of claim 5, wherein the information of the login target corresponding to the second account comprises a domain name of a login website; and
   the login instruction is to log in to a domain name server of the login website based on the login configuration information of the second account.

7. The account login apparatus of claim 5, wherein the information of the login target corresponding to the second account comprises an application identity; and
   the login instruction is to log in to an application corresponding to the application identity based on the login configuration information of the second account.

8. The account login apparatus of claim 5, wherein the login configuration information of the second account comprises an account name of the second account; and
   the login instruction is to enable the login target corresponding to the second account to send a login success message to a login requester, wherein the login success message comprises the account name of the second account, and the account name of the second account is displayed on the login requester.

9. A non-transitory computer storage medium storing machine executable instructions to:
   store an association relation between a first account and a second account, and store information of a login target corresponding to the second account;
   receive a login request for using the first account to log in to the login target corresponding to the second account, search for login configuration information of the second account based on the association relation between the first account and the second account, and send the login configuration information of the second based on the login target corresponding to the second account; and log in to the login target corresponding to the second account according to the login configuration information of the second account;

wherein the login request is a common login request that comprises an account identity of the first account, an account password of the first account and the information of the login target corresponding to the second account; and the machine executable instructions further comprise an authentication instruction;

wherein the authentication instruction is to authenticate the first account based on the account identity of the first account and the account password of the first account.

10. The non-transitory computer storage medium of claim 9, wherein the information of the login target corresponding to the second account comprises a domain name of a login website; and the login instruction is to log in to a domain name server of the login website based on the login configuration information of the second account.

11. The non-transitory computer storage medium of claim 9, wherein the information of the login target corresponding to the second account comprises an application identity; and the login instruction is to log in to an application corresponding to the application identity based on the login configuration information of the second account.

12. The non-transitory computer storage medium of claim 9, wherein the login configuration information of the second account comprises an account name of the second account; and the login instruction is to enable the login target corresponding to the second account to send a login success message to a login requester, wherein the login success message comprises the account name of the second account, and the account name of the second account is displayed on the login requester.

* * * * *